（12） United States Patent
Kaufmann

(10) Patent No.: US 9,527,339 B2
(45) Date of Patent: Dec. 27, 2016

(54) PROCESS FOR THE PRODUCTION OF A TEXTILE PRODUCT

(71) Applicant: Harald Kaufmann, Hattingen (DE)

(72) Inventor: Harald Kaufmann, Hattingen (DE)

(*) Notice: Subject to any disclaimer, the term of this patent is extended or adjusted under 35 U.S.C. 154(b) by 0 days.

(21) Appl. No.: 14/596,263

(22) Filed: Jan. 14, 2015

(65) Prior Publication Data

US 2015/0125650 A1  May 7, 2015

Related U.S. Application Data

(63) Continuation of application No. 13/576,419, filed as application No. PCT/EP2011/050539 on Jan. 17, 2011, now Pat. No. 8,939,100.

(30) Foreign Application Priority Data

Feb. 2, 2010 (DE) .......................... 10 2010 001 511

(51) Int. Cl.
*B44F 1/02* (2006.01)
*B32B 27/12* (2006.01)
(Continued)

(52) U.S. Cl.
CPC ............... *B44F 1/02* (2013.01); *B23B 27/12* (2013.01); *B32B 5/06* (2013.01); *B32B 27/12* (2013.01); *B44C 1/10* (2013.01); *B44C 1/105* (2013.01); *B44C 1/17* (2013.01); *B44C 1/22* (2013.01); *D06H 1/04* (2013.01); *B32B 2250/02* (2013.01);
(Continued)

(58) Field of Classification Search
CPC ............ D06C 7/00; D06C 7/02; D06C 15/00; D06H 1/04; B32B 27/00; B32B 27/04; B32B 27/12; B32B 5/06; B32B 2437/00; B32B 2250/02; D05B 3/20; D05B 11/00; D05C 17/00; D05C 17/02; B44F 1/02; B44C 1/10; B44C 1/17; B44C 1/22; B44C 1/105; B23B 27/12; Y10T 428/24033
See application file for complete search history.

(56) References Cited

U.S. PATENT DOCUMENTS 2,354,049 A  7/1944  Palmquist
3,165,153 A  1/1965  Lanmon
(Continued)

FOREIGN PATENT DOCUMENTS

AT  200691  11/1958
CN  1324306 A  11/2001
(Continued)

OTHER PUBLICATIONS

English Abstract of JP 04096041, Mar. 1992.
(Continued)

*Primary Examiner* — Ismael Izaguirre
(74) *Attorney, Agent, or Firm* — Cahn & Samuels, LLP

(57) ABSTRACT

A process for the production of a textile product includes placing a flat motif template on a textile substrate, sewing the motif template onto the textile substrate in such a way that a perforation defining a desired motif in the motif template is produced, removing the part of the motif template, that is outside the motif defined by the perforation, and permanently fixing the remaining part, having the motif, of the motif template to the textile substrate.

20 Claims, 4 Drawing Sheets

Related U.S. Application Data

(60) Provisional application No. 61/300,494, filed on Feb. 2, 2010.

(51) Int. Cl.

| | | |
|---|---|---|
| *B32B 5/06* | (2006.01) | |
| *B44C 1/17* | (2006.01) | |
| *B44C 1/10* | (2006.01) | |
| *B44C 1/22* | (2006.01) | |
| *D06H 1/04* | (2006.01) | |
| *B23B 27/12* | (2006.01) | |

(52) U.S. Cl.
CPC ..... *B32B 2437/00* (2013.01); *Y10T 428/24033* (2015.01)

(56) References Cited

U.S. PATENT DOCUMENTS

| | | | |
|---|---|---|---|
| 3,172,942 A | 3/1965 | Berg | |
| 3,377,184 A * | 4/1968 | Kukoff | B05D 5/06 |
| | | | 427/259 |
| 3,420,597 A | 1/1969 | Schoonover et al. | |
| 3,700,305 A | 10/1972 | Bingham | |
| 3,971,692 A | 7/1976 | Anderson | |
| 4,427,472 A * | 1/1984 | Trager | A41H 43/00 |
| | | | 112/402 |
| 4,517,237 A | 5/1985 | Pernicano | |
| 4,657,803 A | 4/1987 | Pericano | |
| 4,664,735 A | 5/1987 | Pernicano | |
| 4,849,265 A | 7/1989 | Ueda et al. | |
| 4,902,670 A | 2/1990 | Kanto et al. | |
| 4,939,674 A | 7/1990 | Price et al. | |
| 5,200,268 A | 4/1993 | Hamada | |
| 5,241,919 A * | 9/1993 | LaGreca | D05C 17/00 |
| | | | 112/410 |
| 5,300,169 A | 4/1994 | Tahara | |
| 5,306,374 A | 4/1994 | Hambright | |
| 5,358,281 A | 10/1994 | Grieg | |
| 5,503,906 A | 4/1996 | Olsen | |
| 5,620,775 A | 4/1997 | Laperre | |
| 5,621,993 A | 4/1997 | Stover | |
| 5,631,064 A | 5/1997 | Marecki | |
| 5,633,836 A | 5/1997 | Langer et al. | |
| 5,674,605 A | 10/1997 | Marecki | |
| 5,837,347 A | 11/1998 | Marecki | |
| 5,945,201 A | 8/1999 | Holat | |
| 5,947,044 A * | 9/1999 | Lin | D05C 17/00 |
| | | | 112/439 |
| 5,974,997 A | 11/1999 | Amburgey | |
| 6,060,157 A * | 5/2000 | LaPerre | B44C 1/16 |
| | | | 428/212 |
| 6,155,189 A | 12/2000 | Walner | |
| 6,194,044 B1 | 2/2001 | Stahl | |
| 6,277,229 B1 | 8/2001 | Popat et al. | |
| 6,372,341 B1 | 4/2002 | Jung et al. | |
| 6,465,071 B1 | 10/2002 | Satch et al. | |
| 6,667,095 B2 | 12/2003 | Wheatley et al. | |
| 6,860,214 B1 * | 3/2005 | Wang | D05C 15/00 |
| | | | 112/475.22 |
| 7,574,818 B2 * | 8/2009 | Meschter | A43B 7/14 |
| | | | 36/45 |
| 7,651,976 B2 | 1/2010 | Fukui et al. | |
| 7,946,226 B1 * | 5/2011 | Kaufmann | B41M 1/12 |
| | | | 101/491 |
| 8,418,616 B2 | 4/2013 | Kaufmann | |
| 8,667,896 B2 | 3/2014 | Kaufmann | |
| 8,939,100 B2 * | 1/2015 | Kaufmann | B32B 27/12 |
| | | | 112/439 |
| 2002/0094411 A1 | 7/2002 | Weiss | |
| 2003/0072889 A1 | 4/2003 | Abrams | |
| 2007/0162176 A1 | 7/2007 | Peyser | |
| 2010/0297383 A1 | 11/2010 | Aoyama | |
| 2011/0041741 A1 * | 2/2011 | Cohen | D05C 17/00 |
| | | | 112/439 |
| 2014/0099483 A1 | 4/2014 | Weber et al. | |

FOREIGN PATENT DOCUMENTS

| | | |
|---|---|---|
| CN | 101052534 A | 10/2007 |
| CN | 100469271 C | 3/2009 |
| DE | 1446828 A1 | 2/1969 |
| EP | 0 503 738 | 9/1992 |
| GB | 867783 A | 5/1961 |
| GB | 1 273 895 | 5/1972 |
| JP | 04096041 | 3/1992 |
| JP | 04164647 | 6/1992 |
| JP | 04296838 | 10/1992 |
| JP | 05273652 | 10/1993 |
| JP | 05273655 | 10/1993 |
| JP | 08152684 A | 6/1996 |
| RU | 2220051 C2 | 12/2003 |
| RU | 66278 U1 | 9/2007 |
| WO | 00/24594 A1 | 5/2000 |
| WO | 2009090765 A1 | 7/2009 |
| WO | 2012152679 A2 | 11/2012 |

OTHER PUBLICATIONS

English Abstract of JP 04296838, Oct. 1992.
English Abstract of JP 05273652, Oct. 1993.
English Abstract of EP 0 503 738, Sep. 1992.
English Abstract of JP 04164647, Jun. 1992.
English Abstract of JP 05273655, Oct. 1993.
English Abstract of JP 08152684, Jun. 1996.
German Patent and Trademark Office Office Action, German Patent No. DE 10 2010 001 511.3, dated Nov. 9, 2010.
Notification Concerning Transmittal of International Preliminary Report on Patentability, International Application No. PCT/EP2011/050539, dated Jan. 17, 2011.
English abstract of CN1324306 (A)—Nov. 28, 2001.
English abstract of CN101052534 (A)—Oct. 10, 2007.
Chinese Patent Application No. 201180008073.X, First Office Action, dated Mar. 4, 2014.
English abstract of RU2220051 (C2)—Dec. 27, 2003.
Russian Office Action for RU 2012137147, dated Apr. 25, 2014.
Taiwanese Application No. 100103063, Taiwanese Office Action and Search Report dated Oct. 6, 2014.
English Abstract of CN 100469271 (C)—Mar. 18, 2009.
Chinese Patent Application No. 201180008073.X, Office Action dated Oct. 21, 2014.
English Abstract of WO2012152679, Nov. 2012.

* cited by examiner a)

b)

c)

d)

e)

f)

PROCESS FOR THE PRODUCTION OF A TEXTILE PRODUCT

This application is a Continuation application of U.S. Ser. No. 13/576,419, filed on Aug. 3, 2012, which is a U.S. national stage application of PCT international application PCT/EP2011/050539 filed on 17 Jan. 2011, and claims priority of both U.S. provisional patent application 61/300,494 filed on 2 Feb. 2010 and German patent document 10 2010 001 511.3 filed on 2 Feb. 2010, the entireties of which are incorporated herein by reference.

BACKGROUND OF THE INVENTION

Field of the Invention

The invention concerns a process for the production of a textile product, in particular a textile product provided with a motif having reflecting properties.

State of the Art

DE 1 446 828 A1 discloses a reflecting transfer film and a process for the production of reflex-reflecting articles, for example for marking articles of clothing. The transfer film has a transfer layer comprising an adhesive layer and a rubber-like binding agent layer disposed thereon with incorporated microballs projecting partially therefrom, and a protective layer which is disposed on the adhesive side of the transfer layer and which can be pulled off. On its front side the transfer layer has a dimensionally stable carrier substrate which can be pulled off dry after the gluing-on operation. To transfer it onto an article of clothing a hot iron is firmly pressed onto the carrier substrate of the assembly and then the carrier substrate is pulled off the reflex-reflecting transfer film. To apply markings of different kinds of shapes the motifs in question firstly have to be cut out and then applied to the subjacent article of clothing or fabric.

It is further known in the state of the art for reflecting motifs which are transferred onto a textile product such as for example an article of clothing, in particular individual or free-standing letters, to be provided with a peripherally extending seam after the transfer operation, which admittedly in consideration of the resulting combination of reflecting and non-reflecting reproduction of the motif, leads to attractive effects, but that makes the process overall in consideration of the multiplicity of process steps required and in particular the cutting operation which is complex depending on the respective motif involved complicated and also expensive (as a consequence of the costly laser apparatuses generally used for the cutting operation).

SUMMARY OF THE INVENTION

The object of the present invention is to provide a process for the production of a textile product, which in a particularly economical fashion permits the production of an attractive textile product at a comparatively low level of complication and expenditure.

A process according to the invention for the production of a textile product comprises the following steps:
  placing a flat motif template on a textile substrate,
  sewing the motif template onto the textile substrate in such a way that a perforation defining a desired motif in the motif template is produced,
  removing the part of the motif template, that is outside the motif defined by the perforation, and
  permanently fixing the remaining part, having the motif, of the motif template to the textile substrate.

In that respect here and hereinafter the term "sewing on" in conformity with the usual terminology is used to denote any operation in which one or more sewing threads or yarns are passed through a material to be sewn, wherein the threads are entwined together or to the material being sewn. As perforation of the motif template is produced principally by the step according to the invention of sewing the motif template onto the textile substrate and as the connection produced in that way between the motif template and the textile substrate becomes a permanent fixing (for example preferably being wash-resistant) only in the fixing step (being the concluding step in the sequence of the foregoing process steps), the corresponding seam can also be produced with an embroidery machine. Insofar as and because, after the part of the motif template disposed outside the motif defined by the perforation is pulled off, substantially the seam surrounding the desired motif remains and subsequent permanent fixing is only then effected for example by means of heat or pressure), the step of sewing or applying the motif template to the textile substrate can so-to-speak also be referred as "stitching on".

The invention is based on the concept, when sewing on a motif template which in particular as explained hereinafter can involve a reflection transfer of a suitable configuration, of producing a perforation at the same time (that is to say so-to-speak in one and the same working step), which perforation permits subsequent removal of the part disposed beyond the perforation or outside a desired motif.

In that respect either the motif can already be present in the motif template from the outset or it can first be defined by the perforation or the seam producing the perforation. The motif can be for example any image motif (including multi-part), alphanumeric characters (that is to say for example also a sequence of letters or digits), or simply an area (depicted in one or more colors, including white or black and transparent) which can represent a part of the motif template.

According to the invention therefore with just a few process steps it is possible to produce an attractive textile product which for example shows any lettering on the one hand with a seam forming an outer boundary line and on the other hand in the region within that boundary line with special properties (that is to say for example reflecting), according to the motif template used.

The process according to the invention considerably simplifies in particular the conventionally usual processing of a reflection transfer in which a reflection transfer is firstly cut in the outer region in a complicated and expensive operation (generally manually or using a laser device). The process makes it possible in particular to produce short-run series very inexpensively, for example forgery-proof and high-value individual manufactures for fan clubs, by a procedure whereby for example for a sports organization a film already provided with reflecting logos is produced, to which then individual fan club names can be sewn on according to the invention. That affords a considerable saving in time and cost as for example the operation of sewing on or stitching on the logo is no longer required. If a typical number of stitches of for example between 20,000 and 30,000 stitches per motif is considered, the time saving achieved can be of the order of magnitude for example of about 20 minutes.

In an embodiment the motif template is provided with reflecting properties. For that purpose preferably a reflection transfer with the following layer structure is used as the motif template: base medium, transfer adhesive, optional intermediate color layer, and reflection color, wherein the reflection color contains a multiplicity of reflection particles and wherein the reflection particles are raised above the surface of the hardened reflection color. The base medium (for example an adhesive-repellent, silicone-based protective paper) is removed prior to placement on the textile substrate.

In that respect the invention is based on the realization that a reflection transfer of suitable structure, more specifically formed from a transfer adhesive layer and a color layer comprising a reflection color with a multiplicity of reflection particles, permits such delimitation of the total thickness of the reflection transfer with at the same time good reflection particles that the operation according to the invention of sewing it onto a textile substrate can be implemented with simultaneous production of a sufficiently clean perforation in the reflection transfer.

In that respect it is to be noted that in the state of the art conventional reflection transfers have a comparatively "closed" or sealed layer which does not at all permit sewing to be effected therethrough, or allow a clean perforation effect which that entails. In particular, as already explained in the opening part of this specification, such reflection transfers generally require a kind of "transfer tape" which is required during the production process as a base layer for application of reflection particles—such application operation being in side-reversed relationship—and which after transfer onto the textile substrate closes off the layer structure upwardly, and are consequently not free towards the top side (permitting sewing through the entire reflection transfer).

In an embodiment the motif template on the side towards the textile substrate has a fixing layer. That fixing layer can be both a fixing layer for provisional or temporary fixing on the textile substrate (prior to the subsequent operation of sewing it on) and also a fixing layer which permits concluding permanent fixing, for example under the effect of heat and/or pressure).

In an embodiment the step of placing the motif template on the textile substrate includes at least temporary fixing of the motif template on the textile substrate, preferably using a spray adhesive.

In an embodiment the motif template has a film made from a thermoplastic material (for example polyurethane or polyamide). The motif template can further have a suitable screen printing adhesive (for example as described in EP 1 137 546 B1).

In an embodiment a motif template with a total thickness in the range of between 15 μm and 100 μm, in particular in the range of between 25 μm and 85 μm, is used.

In an embodiment the desired motif is represented in the correct side relationship in plan view by the reflection color in the reflection transfer. Such a representation in correct side relationship is implemented precisely by the above-described reflection transfer of suitable structure, it avoids the use, which is usual in the state of the art, of a "transfer tape", as is required during the production procedure as a base layer for applying reflection particles in side-reversed relationship, and it thus makes it possible to sew through the entire reflection transfer in accordance with the invention.

The invention further concerns a textile product produced by a process according to the invention.

Further configurations of the invention are to be found in the description and the appendant claims.

The invention is described in greater detail hereinafter by means of embodiments by way of example illustrated in the accompanying drawings.

DETAILED DESCRIPTION OF PREFERRED EMBODIMENTS

Figure 1:
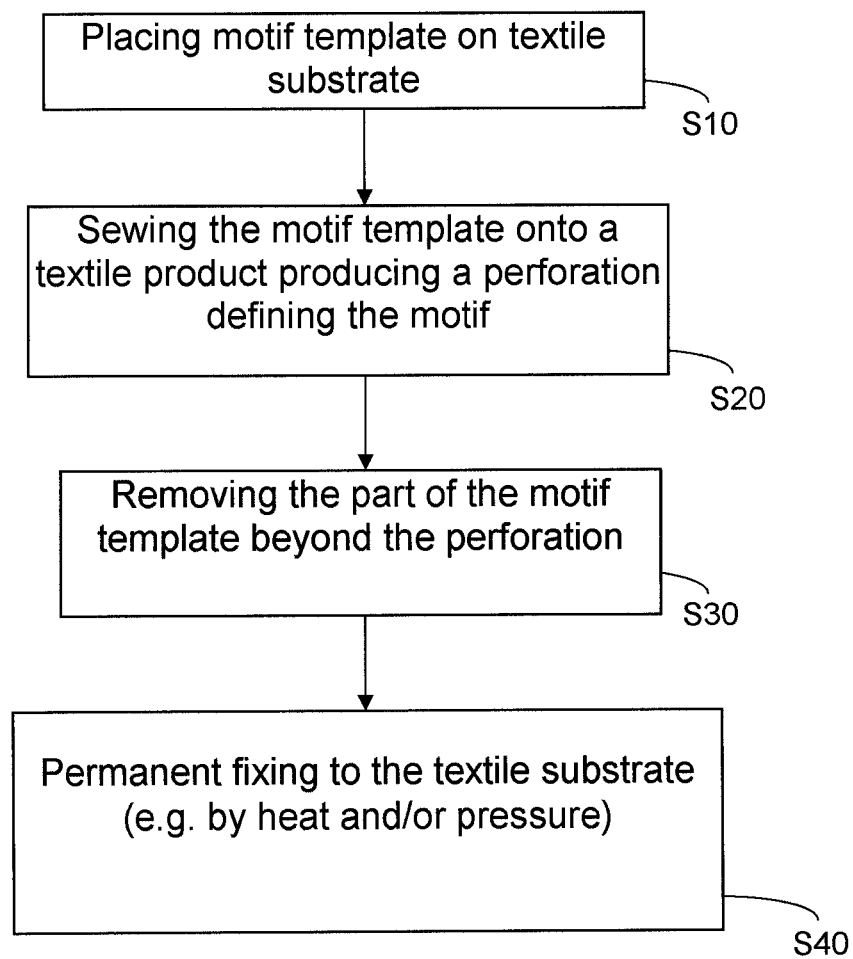
FIG. 1 shows a flow chart to describe a process according to the invention in a preferred embodiment.

A preferred embodiment of the process according to the invention will now be described with reference to the flow chart shown in FIG. 1 and the diagrammatic views serving for illustrative purposes in FIGS. 2a through 2f.

Figure 2:
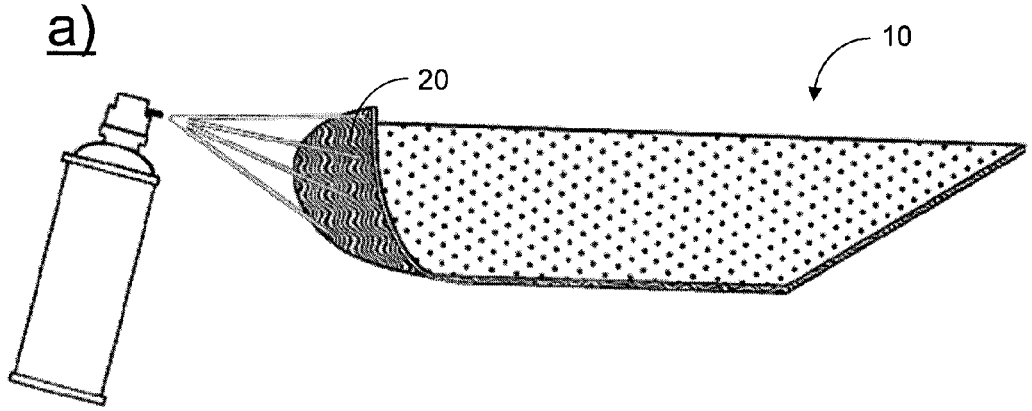
FIGS. 2a-f show diagrammatic views to illustrate the process according to the invention.
Figure 2:
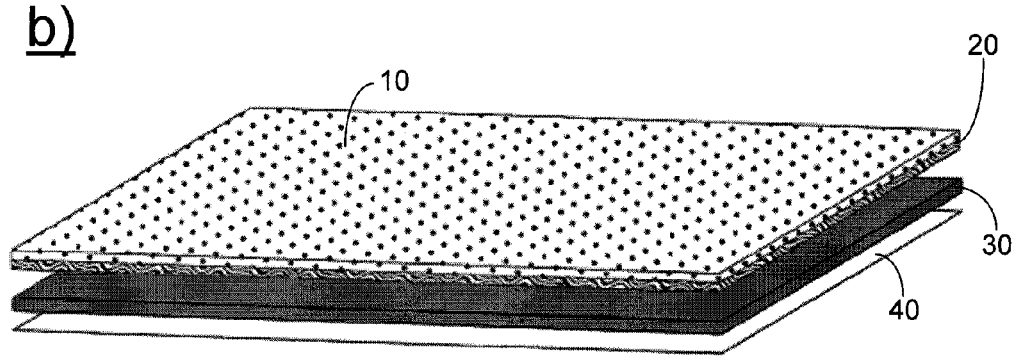
Figure 2:
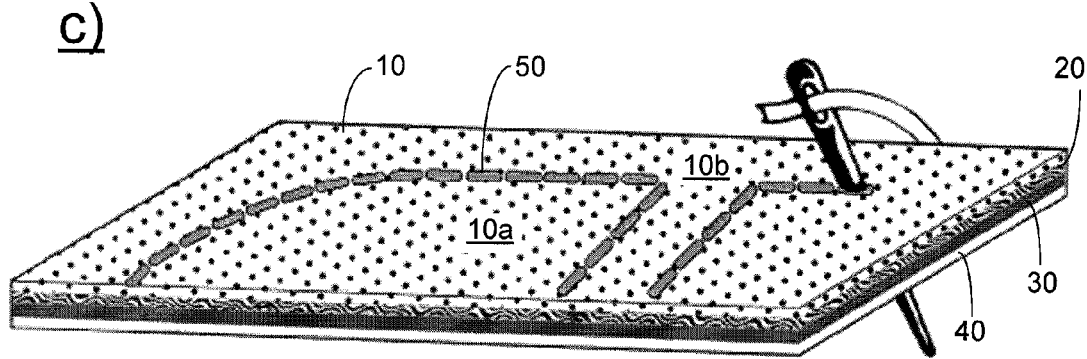
Figure 2:
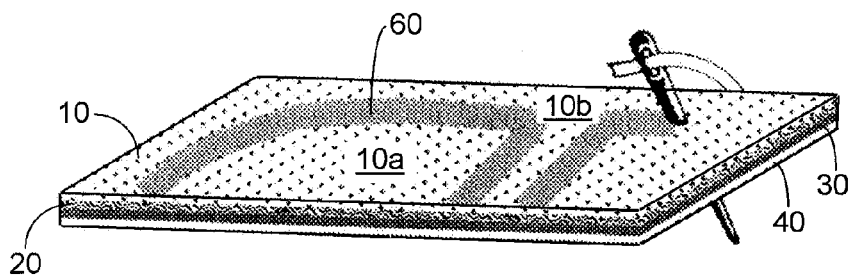
Figure 2:
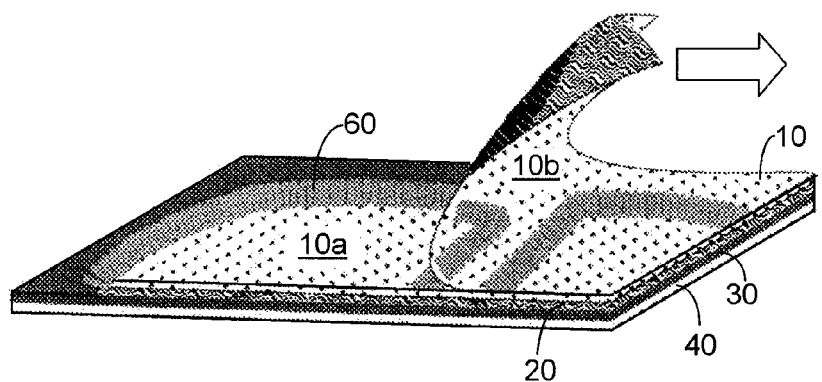
Figure 2:
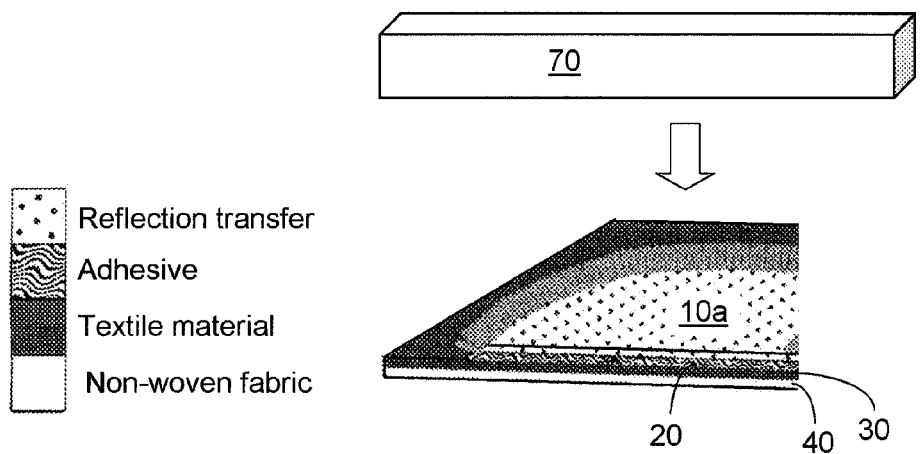
Figure 3:
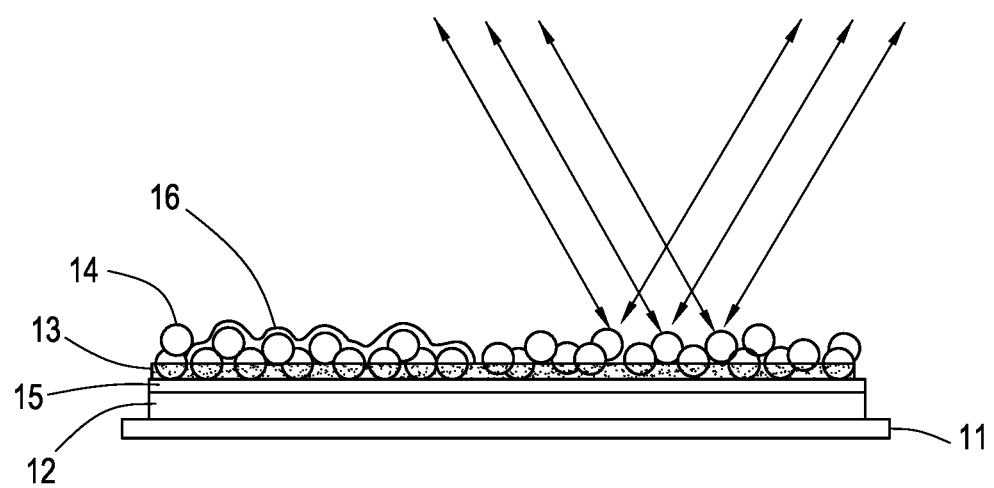
FIG. 3 is a diagrammatic view of a reflection transfer used in the process of FIGS. 1 and 2.

Referring to FIG. 2a, firstly a motif template 10 in the form of a reflection transfer, the structure of which will be described in greater detail with reference to FIG. 3, is provided with an adhesive layer 20 in the form of a spray adhesive for provisional fixing, and is then placed on a textile substrate 30 (for example a T-shirt) (step S10), in which case also a stitching non-woven fabric or embroidery backing 40 is placed under the textile substrate 30.

The motif template 10 or the reflection transfer has a motif (wherein that motif can already be present in the motif template from the outset or can first be defined by the perforation described hereinafter or the seam producing the perforation). That motif can be for example any image motif, alphanumeric characters (that is to say for example a succession of letters or digits) or also simply a surface (which is of one or more colors, including white or black and transparent). In the case of a sequence of letters or digits the seam can also extend around each individual one of the characters (that is to say for example each individual, free-standing letter). In that way, it is possible to achieve in the finished textile product an improved feel in the material, in comparison with sewing on a larger motif over a full area.

In step S20 the motif template 10 or the reflection transfer 10 (after pulling the base medium off the layer structure shown in FIG. 3) is sewn onto the assembly consisting of the textile substrate 30, the adhesive layer 20 and the stitching non-woven material or backing 40, in such a way that at least one perforation is produced in the motif template 10, to define the motif which is desired on the textile product to be produced. That operation of sewing on the motif template 10 firstly includes producing a first seam 50 in the form of a tacking stitch, as shown in FIG. 2c, preferably with a stitch length in the range of between 2 mm and 2.5 mm, followed by the production of a second seam 60 in the form of a satin stitch, preferably of a stitch length in the range of between 2 mm and 3 mm in length, as shown in FIG. 2d. It will be appreciated however that the invention is not limited to those stitching or sewing stitches which are stated only by way of example, but can also be implemented with any other kinds of stitch with which the motif template 10 or film is perforated.

Then as shown in FIG. 2e in step S30 that portion 10b of the motif template 10, that does not belong to the motif desired on the textile product to be produced or that is disposed beyond the perforation, is removed for example manually, in which respect use is made of the fact that the motif template 10 is well perforated by the seams 50, 60 previously produced in step S20.

Thereupon in step S40 as shown in FIG. 2f the textile product together with the remaining part of the motif template 10 or the reflection transfer is laid under a transfer press 70 for permanent fixing and is permanently fixed by means of heat and/or pressure, being pressed for example for a period of between 5 and 20 seconds at a temperature of between 120 and 180° C.

The reflection transfer used as the motif template 10 is preferably of the structure diagrammatically shown in FIG. 3, that is to say it includes in that sequence a base medium 11, a transfer adhesive 12, an optional intermediate color layer 15 and reflection color 13, wherein that reflection color 13 contains a multiplicity of reflection particles 14 (for example of a maximum size of 45 .mu.m) and wherein the reflection particles 14 are raised above the surface of the hardened reflection color 13. Suitable processes for the production of such a reflection transfer are described in EP 1 137 546 B1. The base medium 11 can be an adhesive-repellent, for example silicone-based, protection paper which is pulled off prior to placement of the reflection transfer on the textile substrate. The transfer adhesive 12 used within the reflection transfer 10 can be applied to the base medium 11 by means of any suitable process, for example an extrusion process, a screen printing process (as described in EP 1 137 546 B1), a suitable coating process or in some other fashion.

A suitable transfer adhesive 12 is for example a thermoplastic co-polyester hot melt adhesive film. The film or the transfer adhesive 12 should be of a strength sufficient for the sewing-on operation and in particular on the one hand should not be too soft in order to prevent it from sticking to the needle which is used during the sewing-on operation and which heats up the adhesive in the upward and downward movement. Optionally for that purpose the transfer adhesive 12 can be provided with reinforcing particles. On the other hand the film or the transfer adhesive 12 should not be too hard in order still to permit the needle to pass therethrough without any problem and to allow it to be subsequently torn off along the perforation line produced.

In a further embodiment a laser unit can also be additionally integrated in the apparatus used for the sewing-on operation according to the invention in order to provide for laser processing in accurate relationship during or after the above-described steps on the respective arrangement which is sewn on and secured in place. Although the motif template or film is already sufficiently perforated by the described process steps to permit removal (for example by being torn off) of unwanted film portions, it is additionally possible to use the laser unit to pass over the reflection transfer or the film in order to hatch for example the surface thereof, to "destroy" the reflection at the surface in region-wise fashion in specifically targeted manner and to achieve attractive effects ("reflection/non-reflection"). In that respect use is made of the fact that, in the case of the above-described reflection transfer used in accordance with the invention, the surface with the reflection particles is open upwardly and is not covered with a transfer tape. In addition, non-reflecting elements 16 such as for example flock strips, non-reflecting colors and so forth can also be applied by printing to the reflecting regions.

Even if the invention has been described by reference to specific embodiments numerous variations and alternative embodiments will be apparent to the man skilled in the art, for example by combination and/or exchange of features of individual embodiments. Accordingly it will be appreciated by the man skilled in the art that such variations and alternative embodiments are also embraced by the present invention and the scope of the invention is limited only in the sense of the accompanying claims and equivalents thereof.

The invention claimed is:

1. A process for the production of a textile product, comprising:
   a) placing a flat motif template on a textile substrate,
   b) sewing the motif template onto the textile substrate in such a way that a perforation defining a desired motif in the motif template is produced,
   c) removing the part of the motif template, that is outside the motif defined by the perforation, and
   d) permanently fixing the remaining part, having the motif, of the motif template to the textile substrate,
   wherein step a) includes provisional fixing of the motif template on the textile substrate using a spray adhesive.

2. A process as set forth in claim 1 wherein the motif template has a fixing layer on the side towards the textile substrate.

3. A process as set forth in claim 1, wherein the motif template comprises a film made from a thermoplastic material.

4. A process as set forth in claim 1, wherein a motif template has a total thickness in the range of between 15 μm and 100 μm.

5. A process as set forth in claim 1, wherein the motif template has reflecting properties.

6. A process as set forth in claim 5 wherein a reflection transfer with the following layer structure comprises the motif template:
   base medium,
   transfer adhesive,
   optional intermediate color layer, and
   reflection color, wherein the reflection color comprises a multiplicity of reflection particles and wherein the reflection particles are raised above the surface of the hardened reflection color.

7. A process as set forth in claim 6 wherein in the reflection transfer the desired motif is represented in correct-side relationship in plan view by the reflection color.

8. A process as set forth in claim 5, further comprising the step of applying or printing non-reflecting elements to reflecting regions having said reflecting properties.

9. A textile product produced by a process as set forth in claim 1.

10. A textile product as set forth in claim 9, wherein the textile product comprises a motif with a seam forming an outer boundary line and, within that boundary line, with reflecting properties.

11. A process as set forth in claim 1, wherein by sewing the motif template onto the textile substrate in such a way that a perforation defining a desired motif in the motif template is produced, the motif template is already sufficiently perforated to permit a manual removal of the parts not belonging to the desired motif.

12. A process as set forth claim 1, wherein step d) of permanently fixing the remaining part is performed using heat or pressure.

13. A process as set forth in claim 1, wherein step b) of sewing is performed as stitching the motif template onto the textile substrate.

14. A process as set forth in claim 1, wherein the motif is first defined by the perforation.

15. A process as set forth in claim 1, wherein motif is a multi-part motif.

16. A process as set forth in claim 1, wherein the motif template has a total thickness in the range of between 25 μm and 85 μm.

17. A textile product produced by the process as set forth in claim 1.

18. A process for the production of a textile product, comprising:

a) placing a flat motif template on a textile substrate, the motif template having a fixing layer on a side towards the textile substrate;
b) sewing the motif template onto the textile substrate in such a way that a perforation defining a desired motif in the motif template is produced, the motif template being already sufficiently perforated to permit a manual removal of the parts not belonging to the desired motif;
c) removing the part of the motif template that is outside the motif defined by the perforation, and
d) permanently fixing the remaining part, having the motif, of the motif template to the textile substrate, wherein step a) includes provisional fixing of the motif template on the textile substrate using a spray adhesive.

19. A process for the production of a textile product, comprising:
a) placing a flat motif template on a textile substrate,
b) sewing the motif template onto the textile substrate in such a way that a perforation defining a desired motif in the motif template is produced,
c) removing the part of the motif template, that is outside the motif defined by the perforation, and
d) permanently fixing the remaining part, having the motif, of the motif template to the textile substrate, wherein the motif template has reflecting properties,
wherein a reflection transfer with the following layer structure comprises the motif template:
base medium,
transfer adhesive,
optional intermediate color layer, and
reflection color, wherein the reflection color comprises a multiplicity of reflection particles and wherein the reflection particles are raised above the surface of the hardened reflection color.

20. A process for the production of a textile product, comprising:
a) placing a flat motif template having reflecting properties on a textile substrate,
b) sewing the motif template onto the textile substrate in such a way that a perforation defining a desired motif in the motif template is produced,
c) removing the part of the motif template, that is outside the motif defined by the perforation, and
d) permanently fixing the remaining part, having the motif, of the motif template to the textile substrate, and
e) applying or printing non-reflecting elements to reflecting regions having said reflecting properties.

* * * * *